United States Patent
Hautakorpi et al.

(10) Patent No.: US 9,686,353 B2
(45) Date of Patent: Jun. 20, 2017

(54) METHOD AND NODE FOR LOCATING OBJECTS IN A PEER-TO-PEER NETWORK

(75) Inventors: Jani Hautakorpi, Masala (FI); Ari Keranen, Kirkkonummi (FI); Jouni Maenpaa, Kirkkonummi (FI)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 1280 days.

(21) Appl. No.: 13/378,883

(22) PCT Filed: Jun. 26, 2009

(86) PCT No.: PCT/SE2009/050818
§ 371 (c)(1),
(2), (4) Date: Dec. 16, 2011

(87) PCT Pub. No.: WO2010/151192
PCT Pub. Date: Dec. 29, 2010

(65) Prior Publication Data
US 2012/0110057 A1 May 3, 2012

(51) Int. Cl.
*G06F 15/16* (2006.01)
*H04L 29/08* (2006.01)

(52) U.S. Cl.
CPC ........ *H04L 67/104* (2013.01); *H04L 67/1065* (2013.01)

(58) Field of Classification Search
CPC H04L 67/104; H04L 67/1065; H04L 67/1076
USPC .......... 709/201, 202, 228, 229, 238
See application file for complete search history.

(56) References Cited

U.S. PATENT DOCUMENTS

| 6,778,827 | B1* | 8/2004 | Anderson et al. ............. 455/434 |
| 7,853,932 | B2* | 12/2010 | Chockler ............ G06F 9/44589 717/126 |
| 8,108,502 | B2* | 1/2012 | Tabbara et al. ............... 709/223 |
| 2005/0080858 | A1 | 4/2005 | Pessach |
| 2005/0108203 | A1* | 5/2005 | Tang ................. G06F 17/30106 |
| 2007/0143442 | A1* | 6/2007 | Zhang et al. ................. 709/217 |
| 2008/0288654 | A1* | 11/2008 | Matuszewski et al. ...... 709/238 |
| 2009/0182815 | A1* | 7/2009 | Czechowski et al. ........ 709/206 |
| 2009/0190558 | A1* | 7/2009 | Strutt ................... H04L 1/0019 370/332 |

(Continued)

OTHER PUBLICATIONS

Joung, "Wildcard Search in Structured Peer-to-Peer Networks", IEEE Transactions on Knowledge and Data Engineering, vol. 19, No. 11, Nov. 1, 2007, pp. 1524-1540, XP011193450.

(Continued)

*Primary Examiner* — Davoud Zand
(74) *Attorney, Agent, or Firm* — Rothwell, Figg, Ernst & Manbeck, P.C.

(57) ABSTRACT

This invention includes a method and a node (302) for locating objects in a structured overlay peer-to-peer network (500). Known distributed hash table DHT algorithms are not well suited for wild card searches. This problem has been solved by the current invention by using a node (302) configured with a finger table (310) and a stochastic selector (503) adapted to perform a stochastic search algorithm. In a preferred embodiment of the invention the stochastic search algorithm uses weighted probability values that are assigned to each established connection (312, 313, 314) between the node (302) and other nodes (303, 304, 305) in the overlay peer-to-peer network (500).

16 Claims, 5 Drawing Sheets

(56) References Cited

U.S. PATENT DOCUMENTS

2009/0216910 A1* 8/2009 Duchesneau ............... 709/250
2011/0071841 A1* 3/2011 Fomenko et al. ............ 705/1.1

OTHER PUBLICATIONS

Merz, et al., "Efficient Broadcast in P2P Grids", 2005 IEEE International Symposium on Cluster Computing and the Grid, May 9, 2005, pp. 237-242, XP 010863615.
Vishnevsky, et al., "Scalable Blind Search and Broadcasting Over Distributed Hash Tables", Computer Communications, Jan. 18, 2008, vol. 31, No. 2, pp. 292-303, XP022426922.
Stoica, I., et al., "Chord: A Scalable Peer-to-peer Lookup Protocol for Internet Applications", University of California, Berkeley, 2001, pp. 1-14.
Maymounkov, P., et al., "Kademlia: A Peer-to-Peer Information System Based on the XOR Metric", P. Druschel et al. (Eds.): IPTPS 2002, LNCS 2429, Springer-Verlag Berlin Heidelberg 2002, pp. 53-65.
Rowstron, A., et al., "Pastry: Scalable, decentralized object location and routing for large-scale peer-to-peer systems", Microsoft Research Ltd. et al., Proc of the 18th IFIP/ACM International Conference on Distributed Systems Platforms (Middleware 2001), Heidelberg, Germany, Nov. 2001, pp. 1-22.
Bryan, D., et al., "Concept and Terminology for Peer to Peer SIP", Internet-Draft, draft-ietf-p2psip-concepts-02.txt, P2PSIP Working Group, Jul. 7, 2008, pp. 1-27.
Jennings, C.,"Resource Location And Discovery (RELOAD)_Base Patrol", Internet Draft, draft-ietf-p2psip-base-02.txt, P2PSIP Working Group, Mar. 7, 2009, pp. 1-124.

* cited by examiner

METHOD AND NODE FOR LOCATING OBJECTS IN A PEER-TO-PEER NETWORK

CROSS REFERENCE TO RELATED APPLICATION(S)

This application is a 35 U.S.C. §371 National Phase Entry Application from PCT/SE2009/050818, filed Jun. 26, 2009, designating the United States, the disclosure of which is incorporated herein in its entirety by reference.

TECHNICAL FIELD

The present invention relates to a method and a node for locating objects in a peer-to-peer network.

BACKGROUND

The storing of information in a network has traditionally followed the client-server model, i.e. the information is stored centrally in servers which are accessible by a number of clients. Typical examples are web servers that are accessible over the Internet from clients (home computers, mobile devices etc) located all over the world. The client-server model has more and more been challenged by the peer-to-peer (P2P) model. In contrast to the client-server model the peer-to-peer model has no distinction between clients and servers in the network. A node (also called a peer) can be both a client and a server at the same time and can access information stored in other nodes and store information accessible by other nodes. A network comprising these nodes is consequently called a peer-to-peer (P2P) network. P2P networks are usually overlay networks on top on an existing IP network such as the Internet. A well known example of a P2P network is the set of nodes (such as personal computers) connected to each other using the P2P protocol BitTorrent.

One advantage with P2P networks is that information (here also called objects) can be distributed and not located in a single point of failure such as the server in a client-server network. P2P networks are also more scalable than client-server networks. On the other hand, a search for an object in a client-server network is relatively easy whereas a search for an object in a P2P network is more complex. The problem is to find out in which node the requested object is located. For this reason, the BitTorrent network also comprises a centralized server called a BitTorrent tracker. This tracker keeps information about where (in which nodes) the objects are located. Again, if only one tracker is used it becomes a single point of failure. This means that these trackers need to be very reliable.

To overcome this, a flat structured overlay network has been proposed where the algorithm to locate objects in the network is based on key-based routing, also called Distributed Hash Tables (DHT). In DHT the nodes are organized in a ring or a so called identifier circle. Different DHT algorithms have been devised such as Chord, Pastry and Kademlia. Chord is for example described more in detail in the paper 'Chord: A scalable Peer-to-peer Lookup Protocol for Internet Applications' by Ian Stoica et al published in 2001 in relation to the SIGCOMM '01 conference. One overlay network that relies on the Chord DHT algorithm is the Peer-to-Peer Session Initation Protocol (P2PSIP) as suggested by the IETF papers draft-ietf-p2psip-concepts-02, Jul. 7, 2008 and draft-ietf-p2psip-base-02 (RELOAD), Mar. 7, 2009. P2PSIP/RELOAD allows data to be stored on peers and retreived in an efficient manner.

US patent application 2005/0080858 discloses a system and a method for searching in an unstructured P2P network. In this application multicast request messages are sent to the neighboring peers that in turn may multicast the request messages to other peers until a search radius is reached.

The paper 'Scalable blind search and broadcasting over Distributed Hash Tables' published Aug. 15, 2007 discloses a framework named Recursive Partitioning Search (RPS) for blind search over a structured P2P networks. Here, the node sends queries to all of its fingers where each query comprises a tag that contains a value specifying the endpoint of a recipients search region.

The paper 'Efficient broadcast in P2P grids' published in May 2005 discloses an algorithm to perform broadcast in P2P grids and to reach as many nodes as possible by regular non-redundant distribution.

Structured overlay networks using DHT provides an efficient way for performing exact searches as for example: 'do you have an object corresponding to the key "Ericsson"?'. A problem with structured overlay networks is however that they are not well suited for wild card searches. An example of a wild card search is: 'do you have an object corresponding to the key "Eri*"?'. Many applications and in particular users of the P2PSIP protocol would benefit from having possibilities to do wild card searches.

The paper Wildcard Search in Structured P2P Networks' published November 2007 discloses keytoken-based index and search scheme for wildcard searches in structured P2P networks. In this scheme each keyword is tokenized and hashed into an r-bit vector representing a node in an r-dimensional hyper-cube. This scheme does however require very high-dimensional hyper-cubes and to overcome this problem, additional measures need to be taken that increases the complexity.

SUMMARY

It is the object of the present invention to avoid the disadvantage mentioned above.

The problem is solved by configuring the nodes in the overlay network with a finger table that stores probability values assigned to each established connection and a selector adapted to stochastically select one of these connections. The nodes are further configured with a calculator adapted to calculate and assign the probability values to the established connections and to store these in the finger table. Optionally the calculator is adapted to recalculate the probability values when a connection is released or established.

Each established connection between a node and a plurality of other nodes in the structured peer-to-peer overlay network is assigned a probability value. This value could for example be a weighted probability value proportional to a range of object identifiers on the DHT identifier circle. When the node receives a search request (which can be initiated either by an application in the node itself or received from another node in the overlay network) it initially determines if the object is located in the node itself. If it is, a reply message is returned with the location of the object. In a next step, the node selects stochastically an established connection and forwards the search request to the other node over the established connection. In wild card searches the matches can be found in several nodes. The node receiving the search request can perform the same stochastic selection of connections as the node sending the request. The search can include a search for an object with or without an object id. Optionally the forwarded search request is assigned a hop counter which is incremented (downwards or upwards) for each node it passes. In one embodiment the signaling protocol forwarding the search request (and the reply) is the P2PSIP/RELOAD protocol.

One advantage of the invention is that arbitrary wild card search requests can be performed. The search is not limited to objects with object id's and text but the search can also include objects with an arbitrary content such as images, documents and videos. If for example image recognition or OCR (Optical Character Recognition) software is implemented in the nodes, an image or a document can be sent in the search request which is analyzed by the receiving nodes. This is not possible with traditional DHT algorithms. Another advantage is that no centralized tracker is needed. A further advantage is that the searches easily can pass NATs (Network Address Translation) boxes and other middle-boxes as they are conveyed on an already established connection. Yet another advantage if weighted probability values are used is that the success rate to find a certain object can be even further improved.

The invention will now be described in more detail and with preferred embodiments and referring to accompanying drawings.

DETAILED DESCRIPTION

Figure 1A:
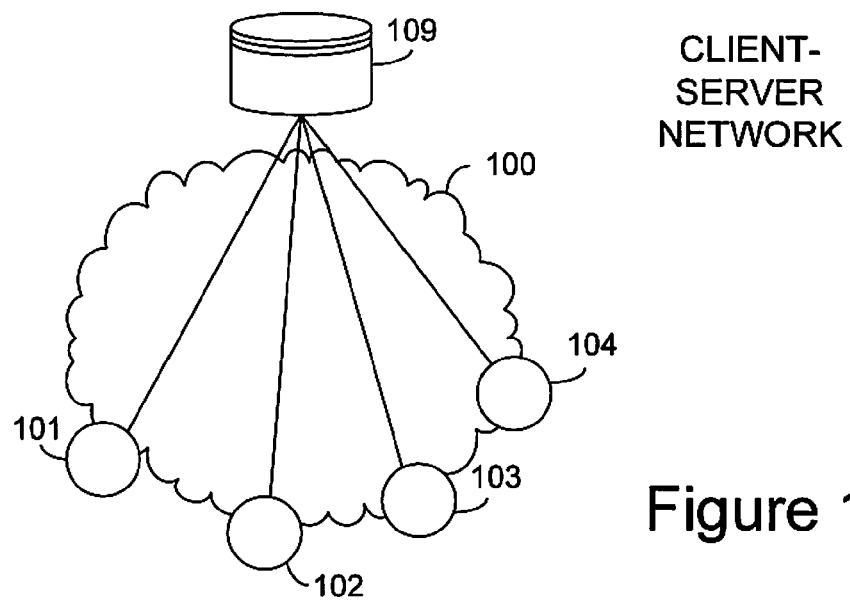
FIGS. 1A and 1B are block diagrams showing typical client-server and P2P network scenarios.
Figure 1B:
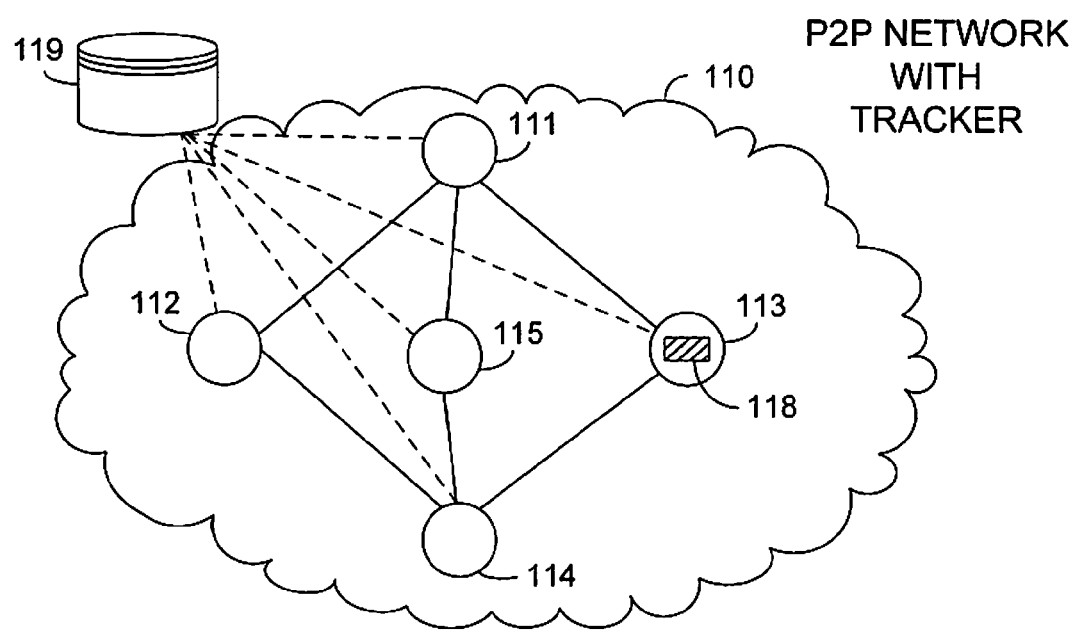
Figure 2A:
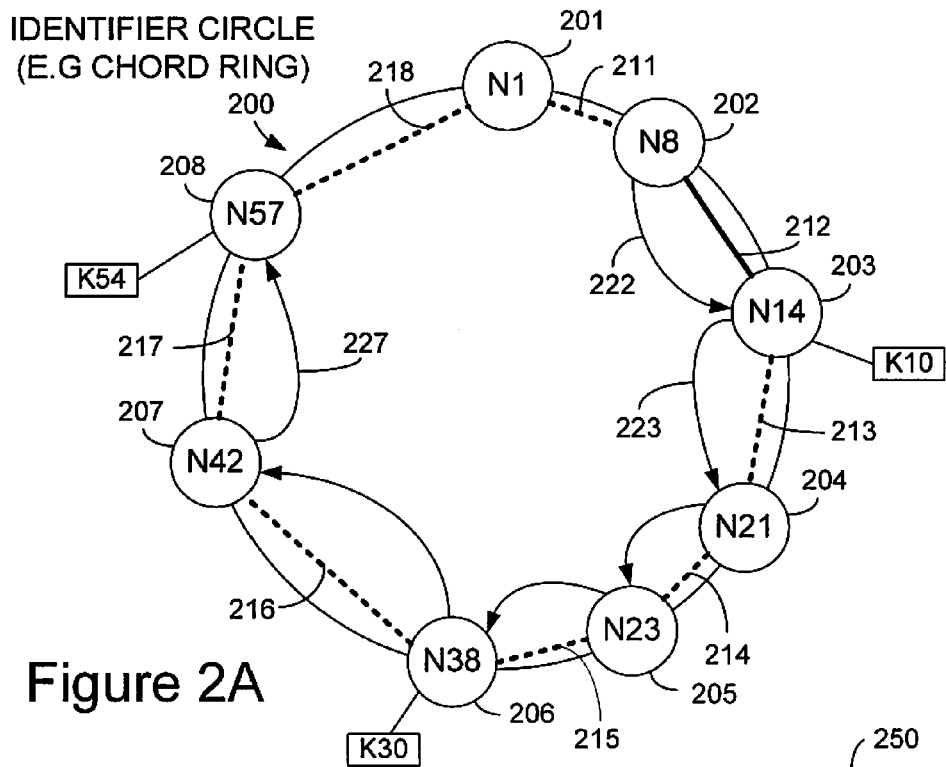
FIGS. 2A and 2B are block diagrams illustrating two search algorithms based on the DHT principle.

Traditionally networks storing information or objects are configured as client-server networks. FIG. 1A illustrates such a network 100 with a centralized server 109 to which a plurality of clients 101,102,103,104 are connected. A typical example is a web server that is accessible over the Internet from personal computers, mobile devices etc located all over the world. A problem with a centralized server is that it is a single point of failure and it need to store a lot of information. FIG. 1B illustrates on the other hand a peer-to-peer (P2P) network 110. This network 110 comprises a number of nodes also called peers 111-115 connected to each other. The P2P network 110 is normally an overlay network on top on a TCP/IP network such as the Internet. Each peer 111-115 can be both client and server at the same time. No centralized server to store the information or the objects is necessary as the objects are distributed among these peers 111-115 which could be personal computers, mobile devices etc. Theoretically all peers 111-115 can be connected to each other in a fully meshed network but when the network becomes large this will be too costly. A typical example of a P2P network is BitTorrent where an object 118 can be stored in at least one of the peers 113. This peer 113 is also called a seeder. In order to know in which peer to find the object 118, the BitTorrent network also comprises a tracker 119 which basically is a centralized server comprising information about where, in which peer, to find the object 118. Again, the centralized tracker 119 is a single point of failure and need to be very reliable. To build a flat P2P network without centralized servers requires that each peer 111-115 have the ability to locate the object 118 themselves. One solution to this is to use an algorithm called key-based routing or Distributed Hash Tables (DHT). Different DHT algorithms have been devised such as Chord, Pastry and Kademlia. The P2PSIP protocol for example relies on the algorithm Chord. In the Chord algorithm, the peers (nodes) are organized on an identifier circle also called a Chord ring. A simplified example of such an identifier circle 200 is illustrated by FIG. 2A. In reality an identifier circle can comprise thousands or millions of nodes. Each node 201-208 in FIG. 2A is organized on the identifier circle 200 and given an identifier N1, N8, N14, N21, N23, N38, N42, N57. These identifiers are created by hashing the IP address of each node using a hashing algorithm such as SHA-1. The identifiers are ordered on the identifier circle 200 module 2m where m is the identifier length. In FIG. 2A the identifier length is m=6 which means that the identifiers N1, N8 etc can be from 0 to 63 (0 to 2m−1). The objects stored in the nodes 201-208 are given object identifiers (also called keys k) by hashing the 160 bit URI address of the object or by hashing some other data assigned to the object. The hashing includes the mapping of the keys to the nodes 201-208 responsible for the keys. The key k is assigned to the first node 201-208 whose identifier N1, N8 etc is equal to or follows the key k. The nodes 201-208 on the Chord ring 200 store three keys K10, K30, K54 which consequently are assigned to the identifiers N14, N38, N57 respectively.

Figure 2B:
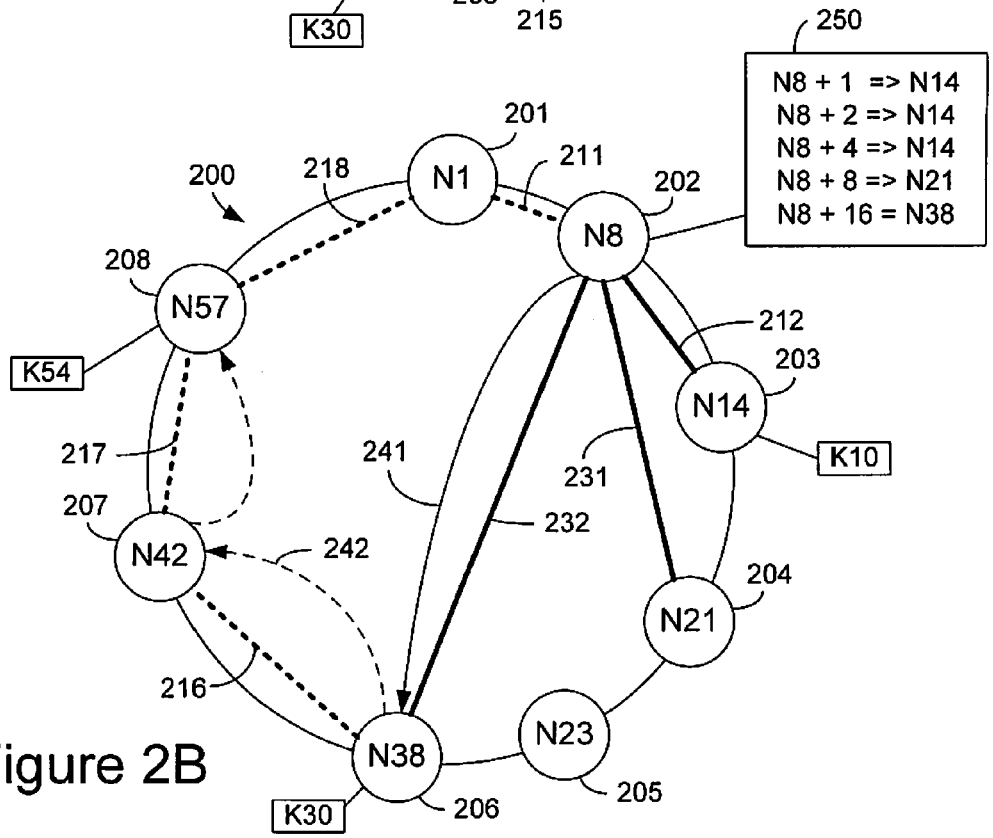

In FIG. 2A, each node 201-208 does only need to know how to contact its successor on the Chord ring 200 and has an established a connection 211-218 to its successor. Assume now that an application within node 202 (having the identifier N8) needs to locate the key K54. According to the traditional DHT, a simple DHT search algorithm is to send a search 222 to its successor node on the identifier ring, in this case node 203 (having the identifier N14). Node 203 will in turn forward the search 223 to its successor, node 204 and so on until the search 227 reaches node 208 (having the identifier N57) to which the key K54 is assigned. The reply (not shown) is returned along the reverse of the path followed by the search. However, this algorithm is not very fast as it visits every consecutive node on the identifier circle 200 until it finds the object K54. An alternative and a faster search algorithm is illustrated by FIG. 2B. In FIG. 2B, node 202 has a set of connections 212,231,232 established to a subset of nodes 203,204,206 close to node 202 on the identifier ring 200. In this algorithm node 202 uses a so called finger table 250. The finger table 250 is a sort of routing table on how to reach this subset of nodes 203,204, 206.

The finger table 250 comprises five fingers. The first finger N8+1 points to node 203 with the identifier N14. N14 is the first identifier that succeeds 8+20 mod 6=9. The second finger N8+2 points to the same node 203 with the identifier N14 as N14 is the first identifier that succeeds 8+21 mod 6=10. The third finger N8+4 points to the same node 203 with the identifier N14 as N14 is the first identifier that succeeds 8+22 mod 6=12. The fourth finger N8+8 points to node 204 with the identifier N21 as N21 is the first identifier that succeeds 8+23 mod 6=16. Finally, the fifth finger points to node 206 with identifier N38 as N38 is the first identifier that succeeds 8+24 mod 26=24. As node 206 with identifier N38 is closest to the key K54, the search message 241 is sent to that node. Node 206 has a similar finger table (not shown) and forwards the search 242 to a third node 207 and so on. Eventually, node 202 receives a reply with information about the location of object K54.

These algorithms are both devised for exact searches for objects (such as K54) in a structured overlay network. However, they are not suited for wild card searches. In an exact search the search is normally completed when the object K54 is located for the first time (in a large network several copies may be available). In wildcard searches one is normally looking for as many objects as possible that have something in common with the searched object. This means that the search often has to locate and return the location of several objects that match the wildcard search criteria. In principle all the three objects K10, K30 and K54 in FIGS. 2A and 2B could fulfill a certain wildcard search criteria.

Figure 3:
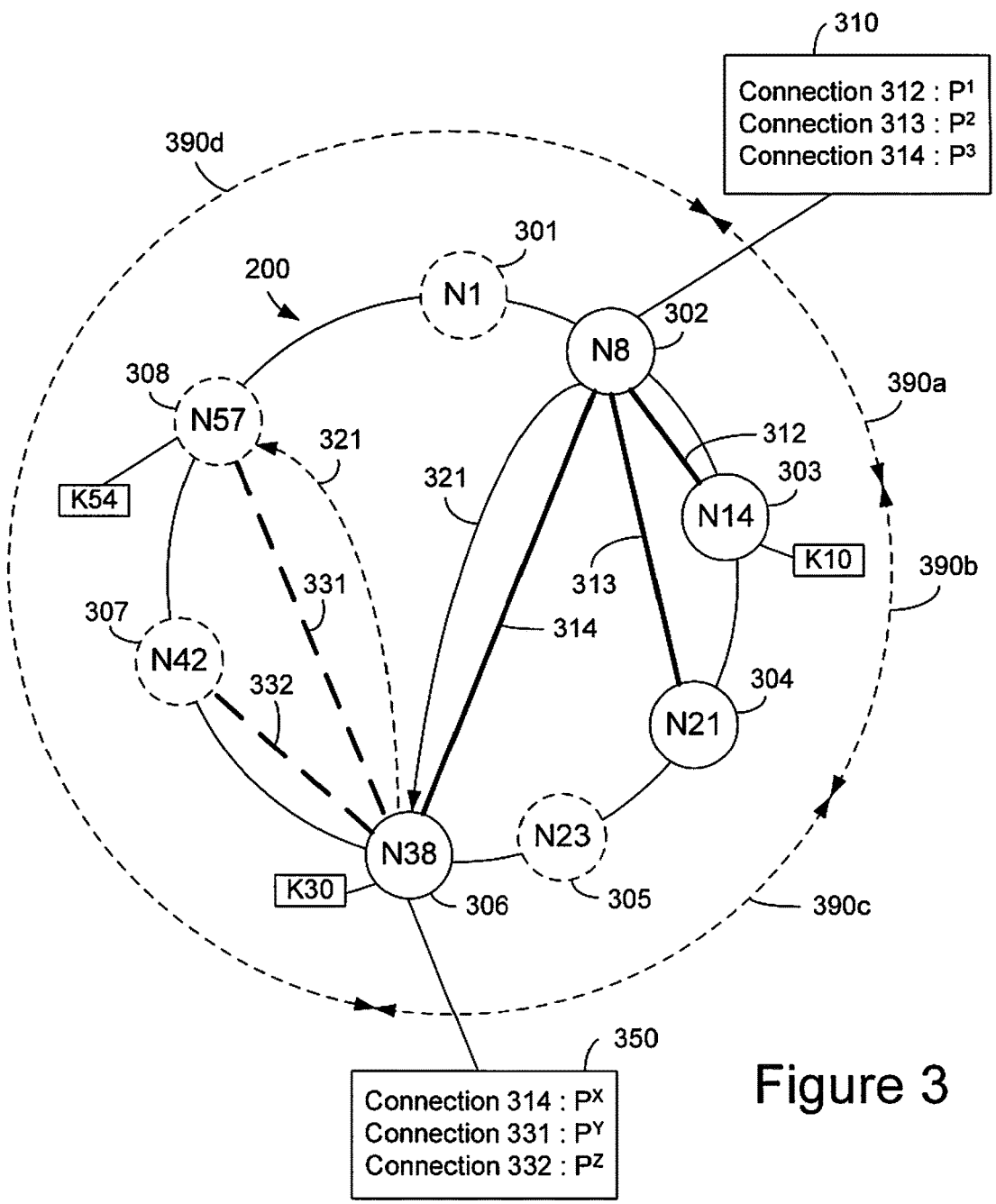
FIG. 3 is a block diagram illustrating a search algorithm according to the current invention.

To overcome this problem, the current invention comprises a method and a node (such as a personal computer or a mobile terminal) configured to use an algorithm based on a stochastic selection of the established connections between the nodes. This is illustrated by FIG. 3. FIG. 3 illustrates a similar identifier ring 200 as in FIGS. 2A and 2B with the identifier length m=6 but with a set of modified nodes 301-308. Three connections 312,313,314 are established (e.g. by using the P2PSIP protocol) from node 302 to three other nodes 303,304,306. The list of established connections is stored in a table 310 in node 302. This table 310 can also be called a finger table in order to use the same terminology as above. To each connection 312,313,314 in the finger table 310 a probability value P1, P2, P3 respectively is assigned. The sum of the probability values P1, P2, P3 is one.

Assume that the node 302 receives a wild card search request. This request can originate either from an application inside the node 302 itself or from some other node. When receiving the search request the node 302 stochastically selects one of the established connections 312,313,314 in the finger table 310, as for example connection 314. The search request received by node 302 is forwarded as a search request 321 on the selected connection 314 towards node 306. Node 306 checks if it has any object that matches the search request. If yes, it returns a reply to node 302, normally along the reverse path as the request. Node 306 has in addition to the established connection 314, two other connections 331,332 established to two other nodes 307, 308. The nodes 301, 305, 307, 308 and the connections 331,332 are dashed in FIG. 3 as node 302 is not aware of their existence. Node 306 has a corresponding finger table 350 with assigned probability values PX, PY, PZ for the connections 314, 331, 332 respectively. When receiving the search request 321, node 306 stochastically selects one of the connections say connection 331 and forwards the search request 321 towards node 308. In order to adjust the number of nodes involved in the search, the search request 321 can be assigned a hop counter that is incremented downwards (or upwards) for each node the search request 321 passes.

In one embodiment of the invention each established connection is assigned an equal probability value P1, P2, P3. That is, the selection of a connection among the established connections 312,313,314 is purely random. In P2P networks it is possible that the number of connections to other nodes can vary over time. Established connections 312,313,314 can be released and new ones can be established. This means that the probability values P1, P2, P3 have to be recalculated at each time the number of established connections changes.

As well as connections can be released or established, the number of nodes can change over time. Nodes 301-308 can leave the structured overlay network and other nodes can join. This means that the size of the range of identifiers allocated to each node 301-308 on the identifier circle 200 may vary.

In order to improve the success rate for finding objects matching the search criteria in such a situation, the probability values P1, P2, P3 can be weighted. The weighted probability values P1, P2, P3 can in a preferred embodiment be proportional to different ranges 390a-d (or segments of the address space) on the identifier ring 200. Range 390a comprises 6 identifiers (N8-N14) out of 64, range 390b comprises 7 (N14-N21), range 390c comprises 17 (N21-N38) and range 390d comprises 32 identifiers (N38-N8). Each established connection 312,313,314 is allocated a range. Connection 312 is allocated range 390b, connection 313 is allocated range 390c and connection 314 is allocated range 390d. The remaining range 390a is not allocated any connection as it allocated to the node 302 itself. The total number of identifiers allocated to the connections 312,313, 314 is 7+17+32 =56. What remains is to calculate the weighted probability values P1, P2, P3 which in this embodiment are set to P1=0.125 (~7/56), P2=0.304 (~17/56) P3=0.571 (~32/56). P1+P2+P3=1. This means for example that the probability to select connection 314 is 0.571.

The ranges may change size if a connection is released or established. In this case the probability values P1, P2, P3 are recalculated.

In yet another embodiment of the invention the weighted probability values P1, P2, P3 are proportional to the number of objects that are stored in each accessible node 303,304, 306 as each node normally stores a different number of objects.

Figure 4:
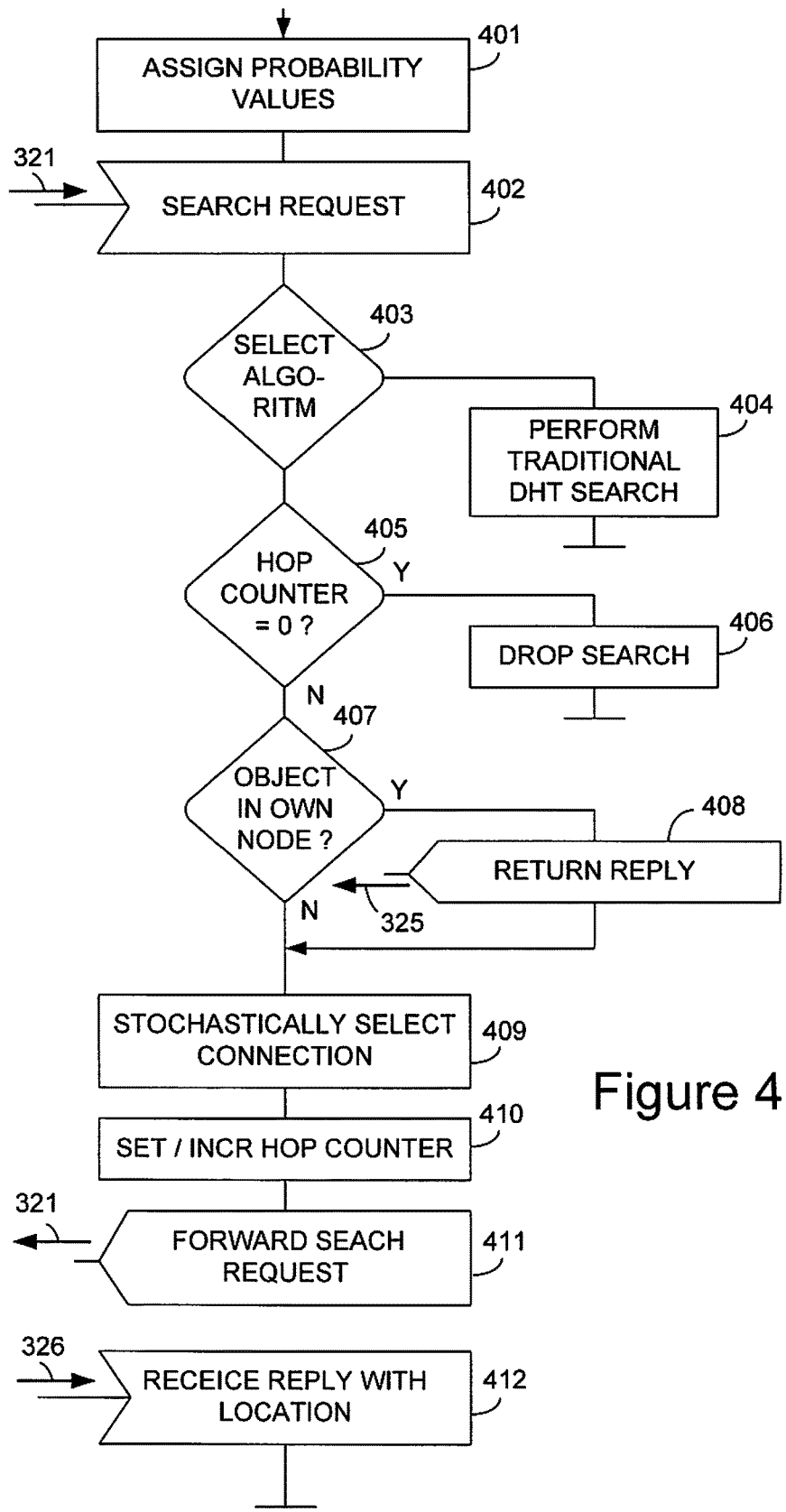
FIG. 4 is a flow chart showing the steps of a search algorithm according to the current invention

FIG. 4 is a flow diagram illustrating an embodiment of a stochastic search algorithm according the current invention.

In step 401 weighted probability values P1, P2, P3 are assigned to each connection 312, 313, 314. Node 302 receives in step 402 a search request 321 (either from an application within the node 302 itself or from some other node) for an object. When receiving the search request 321, a check is made in step 403 whether traditional DHT search or stochastic search is to be used. The search request 321 includes an indication of which type of search is required. If the search request 321 is received from another node, a preferred solution is to include an information element in the peer-to-peer signaling protocol indicating the algorithm to be used. If a traditional DHT is selected in step 403, the node 302 initiates in step 404 a search based on traditional DHT algorithms. If in step 403 the stochastic algorithm is selected and if the search request 321 is received from another node, a check is made in step 405 if a hop counter is included at what value it has. If included and if the value is zero, the search request is ignored (dropped) in step 406. If the hop counter is still greater than zero, a search for the object within the node 302 is started in step 407. If the object is found, a reply 325 is sent (to the application or to the other node) in step 408. Irrespectively if the object is found in node 302 or not, an established connection 314 is stochastically selected from the finger table 310 in step 409. The options to select a connection are those described above.

When preparing the search request 321, a value of the hop counter is set. If the search request came from an application in the node 302 optionally a new hop counter value is set. If the search request came from another node, the received value is incremented downwards.

When the search request 321 has been prepared it is sent over the selected connection 314 towards the node 306 in step 411. The search request 321 can contain a search for an object with an object id or a search for an object without any object id. In the latter case the object can be an arbitrary content file such as an image, a document, a video etc. If for example image recognition software is implemented in the receiving node 306, an image received in the search request 321 can be analyzed. If any image stored in node 306 has a close match with the image received, a reply 326 with the location of the matched objects is sent from node 306 and received by node 302 in step 412. Node 306 will a next step (not shown) carry on the search request in the same manner as for node 302.

In the embodiment above a hop counter has been included in the search requests in order to limit the number of hops in the overlay network. It is noteworthy that for a person skilled in the art other equal solutions to handle the hop counter can be implemented in order to achieve the same effect.

Figure 5:
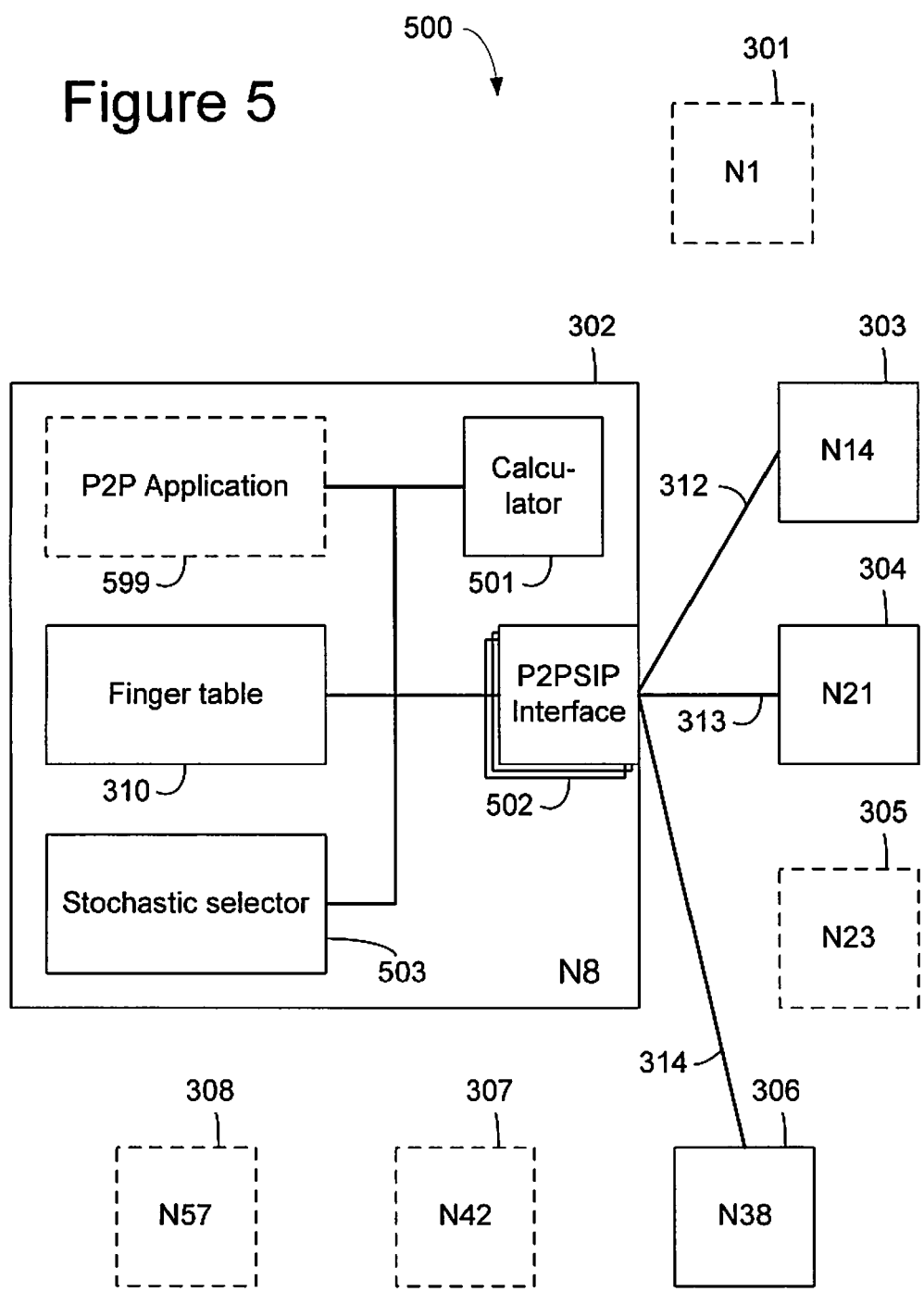
FIG. 5 is a block diagram illustrating a node (peer) according to the current invention.

A node 302 in a structured overlay network 500 configured to perform at least one of the embodiments described above is illustrated in FIG. 5. Again, node 302 has three established connections 312,313,314 to three other nodes 303,304,306. The node 302 comprises at least one signaling protocol interface 502 for sending and receiving search requests to and from the other nodes 303,304,306. The signaling protocol can be an agreed peer-to-peer signaling protocol such as P2PSIP or RELOAD.

The node 302 is further configured with a finger table 310 which stores the probability values P1, P2, P3 assigned to each established connection 312,313,314. For each established connection 312,313,314 there is an entry ponting out the corresponding probability value P1, P2, P3. The node 302 is further configured with a stochastic selector 503, This stochastic selector 503 is adapted to stochastically select one of the connections 312,313,314 in the finger table 310. The probability to select a particular connection as for example connection 314 is dictated by the corresponding probability value P3.

In order to set the correct probability values P1, P2, P3 the node 302 is further configured with a calculator 501 adapted to calculate and assign the probability values P1, P2, P3 to the established connections and to store these in the finger table 310. Optionally the calculator 501 is adapted to recalculate the probability values P1, P2, P3 when a connection is released or established.

As said above, the node 302 is adapted to receive search requests 321 from other nodes 303,304,306 in the overlay network 500 but it is also adapted to receive search requests 321 initiated by an optional peer-to-peer application 599 (dashed box in FIG. 5) located in the node 302 itself.

If the search request 321 is received from another node and P2PSIP or a similar peer-to-peer signaling protocol is used, a preferred solution is to include an information element in the signaling protocol indicating the algorithm to be used.

In order to be backward compatible with nodes not supporting the stochastic search algorithm described above, the absence of the information element carrying the algorithm indication is interpreted as that traditional DHT search is to be used. Correspondingly, the search request is adapted so that the information element (or the whole search request) is ignored by nodes not having the stochastic search algorithm implemented.

The embodiments of the invention described above are focused on performing wild card searches. The stochastic search algorithm is however not limited to wild card searches. Exact exact searches can also benefit from this algorithm.

The invention claimed is:

1. A method for searching for objects located in a set of nodes interconnected in a structured peer-to-peer overlay communication network, wherein each node is a device, where each node in the set of nodes is assigned a range of object identifiers according to a distributed hash table algorithm, and the set of nodes includes a first node that is operable to select a node from a predefined subset of N nodes, N being greater than 1, and further operable to forward a search request to the selected node, wherein each node included in the subset is also included in said set of interconnected nodes, said method comprising the steps of:

assigning in the first node of the structured peer-to-peer overlay communication network a probability value to each node included in said subset of nodes, wherein the sum of said probability values is less than or equal to 1;

receiving at the first node, a search request for an object in the structured peer-to-peer overlay communication network;

the first node stochastically selecting one and only one node from said subset of nodes based on the assigned probability values such that, for each node included in said subset of nodes, the probability that said node is the one and only one stochastically selected node is dictated by the probability value assigned to said node; and the first node forwarding the search request to the selected node.

2. The method of claim 1, wherein all the nodes included in said subset of nodes are assigned equal probability values.

3. The method of claim 1, wherein each node included in said subset of nodes is assigned a weighted probability value.

4. The method of claim 3, wherein each node included in said subset of nodes is allocated a range of object identifiers on a distributed hash table identifier ring and where each weighted probability value is proportional to the size of the corresponding range.

5. The method of claim 3, wherein the weighted probability value is proportional to the number of stored objects in each corresponding node included in said subset of nodes.

6. The method of claim 1, wherein the search request comprises an object identifier for the object to be searched.

7. The method of claim 1, wherein the search request comprises an arbitrary content file to be searched.

8. The method of claim 1, further comprising modifying the value of a hop counter in the forwarded search request.

9. The method of claim 1, wherein the signaling protocol conveying the search request and reply messages is a peer-to-peer signaling protocol and the distributed hash table algorithm is a Chord algorithm.

10. The method of claim 1, wherein the search request for an object in the structured overlay network comprises a wildcard search.

11. The method of claim 1, wherein the search request for an object in the structured overlay network comprises an exact search.

12. The method of claim 1, wherein the search request for the object comprises a search type indicator indicating a type of search algorithm to be employed for the search of the object, and the method further comprises:

evaluating the search type indicator; and determining, based on the evaluation of the search type indicator, whether a stochastic search should be performed or Distributed Hash Table (DHT) search should be performed, wherein the step of the first node stochastically selecting one and only one node occurs a result of the first node determining that i) the object is not located in the first node and ii) the stochastic search should be performed based on the search type indicator included in the search request.

13. A first node in a set of nodes interconnected in a structured peer-to-peer overlay communication network, wherein each node is a device, where each node in the set of nodes is assigned a range of object identifiers according to a distributed hash table algorithm, the first node being operable to select a node from a predefined subset of N nodes, N being greater than 1, and further operable to forward a search request to the selected node, wherein each node included in the subset is also included in said set of interconnected nodes, and the first node being configured with at least one signaling protocol interface adapted to send and receive search requests, the first node comprising:
 a finger table adapted to store probability values assigned to each node included in said subset of nodes, wherein the sum of said probability values is less than or equal to 1;
 a calculator adapted to calculate the probability values, to assign them to each node included in said subset of nodes and to store them in the finger table; and
 a selector adapted to stochastically select one and only one node from the finger table when receiving a search request such that, for each node included in said subset of nodes, the probability that said node is the one and only one stochastically selected node is dictated by the probability value assigned to said node, wherein
 the first node is configured to forward said search request to said selected node.

14. The first node of claim 13, wherein the calculator is further adapted to calculate the probability values so that each probability value is proportional to a range of object identifiers on a distributed hash table identifier ring.

15. The first node of claim 14, wherein the calculator is further adapted to recalculate the probability values if a node included in said subset of nodes is removed from said subset of nodes or if a new node is added to said subset of nodes.

16. The first node of claim 13, wherein the signaling protocol interface is a peer-to-peer signaling protocol interface.

* * * * *